(12) United States Patent
Stovall

(10) Patent No.: US 10,740,805 B2
(45) Date of Patent: Aug. 11, 2020

(54) INTERACTIVE FEEDBACK SYSTEM

(71) Applicant: CandidCoffee, Inc., Chicago, IL (US)

(72) Inventor: Thomas K. R. Stovall, Matteson, IL (US)

(73) Assignee: CandidCoffee, Inc., Chicago, IL (US)

( * ) Notice: Subject to any disclaimer, the term of this patent is extended or adjusted under 35 U.S.C. 154(b) by 658 days.

(21) Appl. No.: 14/222,574

(22) Filed: Mar. 21, 2014

(65) Prior Publication Data

US 2014/0289160 A1 Sep. 25, 2014

Related U.S. Application Data

(60) Provisional application No. 61/803,914, filed on Mar. 21, 2013.

(51) Int. Cl.
*G06Q 30/02* (2012.01)
(52) U.S. Cl.
CPC .................. *G06Q 30/0282* (2013.01)
(58) Field of Classification Search
CPC ...................................................... G06Q 30/02
See application file for complete search history.

(56) References Cited

U.S. PATENT DOCUMENTS

2003/0115023 A1* 6/2003 Nickerson ........... G06F 3/04847 702/188
2005/0192854 A1* 9/2005 Ebert ..................... G06Q 30/02 709/224
2006/0190475 A1* 8/2006 Shi .......................... G06Q 30/02
2006/0265368 A1* 11/2006 Nickerson ............. G06F 16/958
2008/0059286 A1* 3/2008 Nickerson ............. G06Q 10/10 705/7.32
2008/0255929 A1* 10/2008 Mouton .................. G06Q 30/02 705/7.32
2009/0299824 A1* 12/2009 Barnes, Jr. ........... G06F 3/04847 705/7.39
2010/0038416 A1* 2/2010 Canora .................. G06Q 30/02 235/375

(Continued)

OTHER PUBLICATIONS

Sentiment Analysis of Reviews: Should we analyze writer intentions or reader perceptions, Isa Maks and Piek Vossen, Vu University; 2013 (Year: 2013).*

(Continued)

*Primary Examiner* — Dennis W Ruhl
(74) *Attorney, Agent, or Firm* — Richards Patent Law P.C.

(57) ABSTRACT

A feedback system including a controller configured to: register a system account for each of a plurality of users, wherein the feedback system account includes a unique identification code for each of the plurality of users; provide a graphic user interface through which a first user: generates a request for feedback; selects one or more groups to which to communicate the request for feedback, where in the selection of the groups includes associating one or more unique identification codes with each of the groups; receives feedback from at least a second user associated with a unique identification code associated with one of the groups, wherein, upon receipt of the feedback from the second user, the first user is automatically authorized to reply to the second user; and accesses feedback analytics related to the feedback received in response to the request for feedback.

17 Claims, 9 Drawing Sheets

(56) References Cited

U.S. PATENT DOCUMENTS

| | | | |
|---|---|---|---|
| 2011/0106721 A1* | 5/2011 | Nickerson | G06Q 30/02 |
| | | | 705/347 |
| 2013/0191180 A1* | 7/2013 | Teo | G06Q 30/02 |
| | | | 705/7.32 |
| 2015/0149315 A1* | 5/2015 | Tischer | G06Q 30/0601 |
| | | | 705/26.1 |

OTHER PUBLICATIONS

Sentiment Analysis, KNIME; www.knime.com/blog/sentiment-analysis; 8 pages; 2014 (Year: 2014).*

* cited by examiner

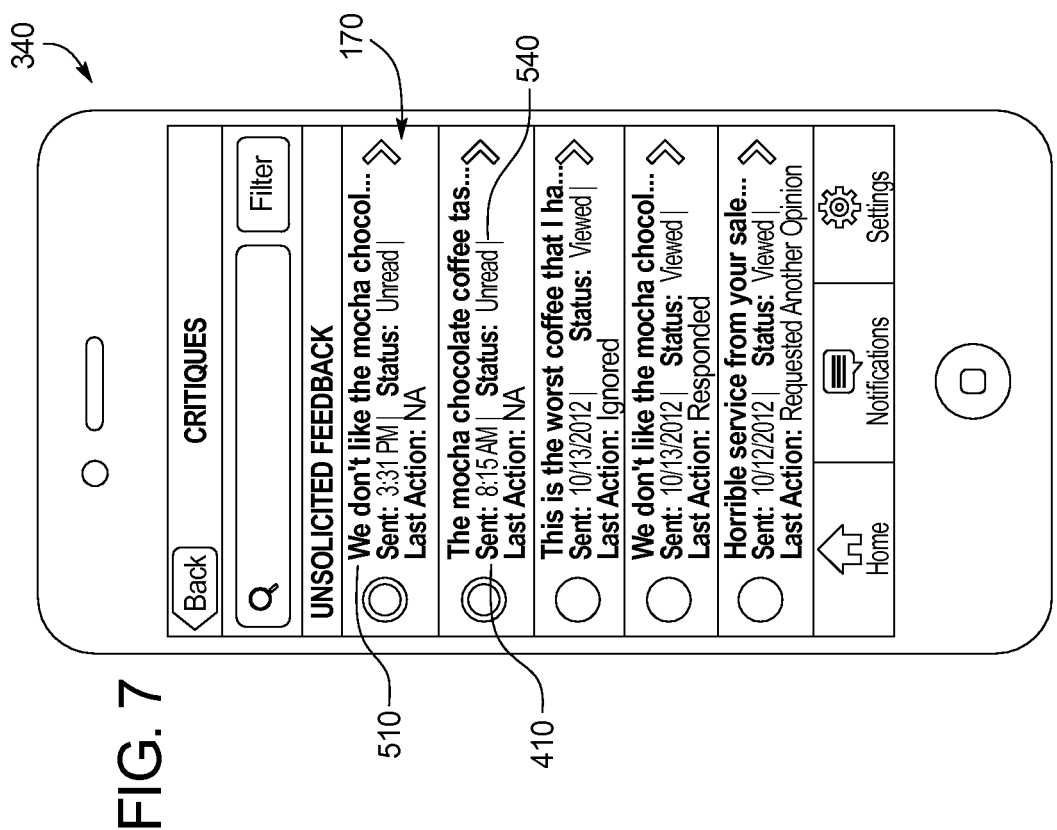

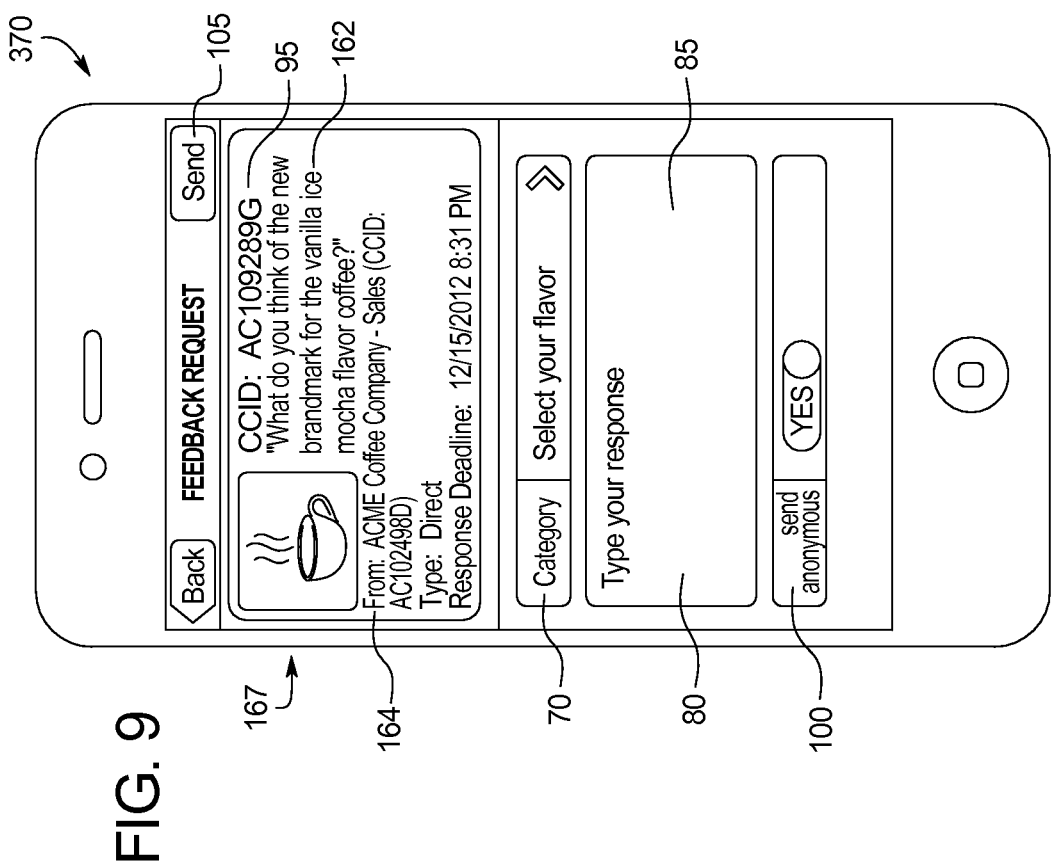

INTERACTIVE FEEDBACK SYSTEM

CROSS-REFERENCE TO RELATED APPLICATIONS

This application incorporates by reference and claims priority to U.S. Provisional Patent Application No. 61/803,914 filed Mar. 21, 2013.

BACKGROUND OF THE INVENTION

The present subject matter relates generally to a system for interactive feedback between consumers and businesses. More specifically, the present invention relates to systems that enable users to send feedback other users, to request feedback from other users, to respond to feedback, and to view summaries and statistics of feedback received. Using the systems and methods described herein, individuals and companies can send, receive, respond to, and request feedback conversations that are tracked by company, by location, by department, by employee, by user group, and by individual user. The users are also able to view summaries and statistics of the feedback and feedback requests sent and received using the systems and methods described herein.

Receiving feedback from consumers is an important business process. Feedback helps businesses to correct mistakes, find new opportunities, reduce cost, and create value. Likewise, consumers find value in providing feedback to businesses so that the business may meet the customers' needs, to compliment good service, or to remedy poor service.

Previous approaches to providing and receiving feedback to businesses have generally been ad hoc and incomplete. One previous feedback mechanism is the feedback card. This form of feedback fails to take advantage of the speed offered by new technologies. Additionally, the right party in the business for the feedback may not necessarily receive feedback cards. Newer technologies, such as feedback email addresses, may speed the delivery of feedback, but do not ensure that the feedback is received by the appropriate party. There is a need for feedback that is quickly received by the correct party.

Additionally, previous feedback systems failed to direct feedback to the appropriate business unit to receive and act on the feedback. For example, a business may have many different business locations. A customer may want to provide feedback about the specific location, provide feedback to certain employees, or provide feedback to the corporate office. Previously used in-store feedback cards may not provide the consumer a sufficient assurance that the feedback will be seen by corporate. Additionally, previous systems provide little expectation of a timely response.

Further, previous feedback mechanisms failed to provide summary statistics to permit decision makers to leverage feedback to find actionable insights.

Accordingly, there is a need for a feedback system to send feedback to other users, request feedback from other users, to respond to feedback, and to view summaries and statistics of feedback received, as described herein.

BRIEF SUMMARY OF THE INVENTION

To meet the needs described above and others, the present disclosure provides an interactive feedback system enabling communication between consumers, businesses, employees, etc. The systems and methods generally provide functionality for businesses to connect with any other company and any individual who is connected to their business in any way, whether as an advisor, investor, supplier, distributor, contractor, employee, customer, affiliate, strategic partner, etc. The systems and methods described herein apply for all business connections, as will be recognized by those skilled in the art based on the descriptions provided herein.

On the personal side, the systems and methods enable individuals to connect to any business or other personal user with whom they desire to send, receive, respond to, and request feedback conversations. For sake of clarity, most of the examples provided herein are framed from the perspective of business to individual communications. These examples are not intended to be limiting.

The feedback system may be provided as a user device application running on a mobile device that communicates with a server to permit communication between consumers and businesses. Using the mobile application, users may send feedback to other users, request feedback from other users, respond to feedback, and view summaries and statistics of feedback received (i.e., feedback analytics). When using the feedback system, the feedback system may present to the user a user interface including a series of screens to perform the functionality of the system by receiving input and providing output.

Individual users may use the feedback system to send feedback to other individual users that the user is connected to in the feedback system and to companies in the feedback system. Users may be individuals, companies, company subunits, employees, etc. For a company in the feedback system, feedback may be directed to the company as a whole, to specific locations, to specific departments, and to specific employees. Feedback may be sent under the user's name, or may be sent anonymously. Any user who receives feedback in the feedback system may reply to the feedback the user has received to begin a conversation.

Feedback may include: a freeform text feedback where the user may provide written comments, a selection of a category of feedback, e.g. whether the feedback is praise, a critique, or a suggestion; a selection of the type of feedback, e.g., Ambiance, Customer Service, Safety Concern, Location, Product Quality, Cleanliness, Staff, etc. Feedback may identify the party to receive the feedback. In an embodiment, the feedback may be directed to users that the user has connected with using social connections functionality. In other embodiments, GPS functionality of a user device may be used to locate nearby businesses to which feedback may be provided. In further embodiments, the user may use an identification code provided by another user to identify that user to the system and provide feedback and/or connect with that user using the social connections functionality.

The feedback system may include connections functionality to connect users on the feedback system. For example, companies may add managers and employees to the company profile and assign them to them to specific locations and or departments. Each employee may have associated permissions that may or may not permit the employee to communicate with customers in the feedback system, to view analytics for the business or business units, or to otherwise interact with the customers of the business.

Employees, other users, and other companies may connect to a company's account and leave feedback, and that company may send responses through the feedback system directly to those users who left feedback. Feedback for a company or a company subunit may be delegated to administrators who may engage in conversations with the user providing the feedback. Further, some conversations may include multiple parties. For example, users may create groups in the app to manually segment their connections in specific ways that make their responses to certain feedback requests more targeted and contextual, i.e.—Suppliers, Distributors, Investors, Friends, Colleagues, etc.

In an embodiment, a user may use the feedback system to send unsolicited feedback. For example, using a mobile device, a user may access a feedback form screen of the feedback system for inputting feedback to send to another user, such as a business. On the feedback form screen, the user may first select a feedback type, such as feedback or suggestion. Then, the user may also select a feedback tone category such as praise, critique. Next, the user may enter comments into a freeform text feedback box. After that, the user may select a recipient using recipient selection screens. Further, the user may elect to make the feedback anonymous by activating the anonymity button. Finally, when the user is satisfied with the feedback, the user may select the send button to trigger the feedback system to deliver the feedback to the recipient. It is contemplated that in other embodiments, feedback may include further information. For example, feedback may include a rating to indicate satisfaction with their interaction with the business. Further, the submission of the feedback may be accompanied by social media functions such that the user can first share the feedback to the company and then be prompted to share to the feedback across one or more of the user's social networks, including the communication of the business's identification code such that others in the social network may also provide feedback to the business or may otherwise connect with the business.

In an embodiment, the feedback system may further permit a user, such as a business, to solicit feedback from other users by sending a request for feedback. For example, using a mobile device, an employee of the business may access a request for feedback screen of the feedback system. The request for feedback screen may include a freeform text box to input the feedback request text. A sender input may permit the user to select the sender of the request for feedback, such as their business or personal account. A feedback request type button may permit the user to choose between requesting direct feedback or open feedback. Direct will send request to a selected group of individuals and allow a specified amount of time for individuals to answer requests. Open will create a QR code and/or request identification code that can be used by users to respond to a request for feedback. The user may select a recipient using a recipient selection input. The user may also specify a close time to limit the time users have to provide the feedback and encourage promptly answering the request for feedback. In an embodiment, the feedback system may permit users to limit response time for direct requests to a limited time period, for example, within 6 hrs, 12 hrs, 24 hrs, 48 hrs, etc.

When a user receives a request for feedback, the user may access a request response screen of the feedback system to enter a response. The request response screen may display details of the request for feedback, such as: feedback request text; sender; identification code of the sender; and close time. The user may select a feedback tone category, such as praise or critique, and enter feedback comments into a freeform feedback box. The user may choose to send the feedback anonymously using an anonymity button. After entering the comments, the user may click the send button to send the feedback to sender of the request for feedback.

The feedback system may include functionality to view summaries and statistics of feedback received. For example, company administrators and employees can view analytics for any unsolicited feedback received or responses to feedback requests for any location, department, or employee that they have hierarchal permission to view. Additionally, individual users, such as employees, may view analytics for any unsolicited feedback received or responses to feedback requests sent and received.

For example, a business statistics screen of the feedback system may permit viewing of summary statistics of the feedback received by a business. The business statistics screen may include overview information of the business, such as the number of locations, number of departments, number of employees, number of managers, number of groups, and number of connections. An overview praise statistic may show the percentage of feedback received that was categorized as praise. A total requests statistic may list the number of requests for feedback sent, and list the total praise, and total critiques. A total feedback messages statistic may list the number of messages of feedback received, and list the total feedback praise, total feedback critiques, and the total suggestions.

As another example, a business subunit summaries screen of the feedback system may display summary statistics of the feedback received by the subunits of a business. The business subunit summaries screen may include a listing of various business subunits, such as locations, departments, employees, etc. For each subunit, the business subunit summaries screen may include a subunit praise statistic that may reflect the percentage of positive feedback that the subunit has received.

In some embodiment, the feedback system may enable feedback collaborations between companies. For example, many companies sell products to distributors rather than the end customer, and thus have no way to communicate directly with the end customer. Using the feedback system, the distributor may permit the company to send an indirect request for feedback directly to its consumers. The feedback, analytics, etc. from that request may be forwarded to the company without permitting the company direct access to the relationships and connections of the distributor.

In some embodiments, the feedback system may be integrated with point-of-sale retail systems. By linking the systems, every purchase online and at every cash register of a user of the feedback system may be fed into a user's profile so that the company knows what the user purchased. Further, users may then be queried for feedback regarding the user's purchase experience. Additionally, the feedback system may permit the business to follow-up and ask customers would they like to purchase additional items, such as related goods and services.

In some embodiments, the feedback system may permit a business user to compare their summaries and statistics to other users. For example, the feedback system may include a standardized rating system. The rating system may rate or rank businesses in the feedback system. The ratings may include feedback-rating percentages broken down by Country, Region, Industry, and Business Type for all companies in every market and segment across the world. Additionally, a real-time, trending, public dashboard may allows customers to view a feedback message board as well as feedback approval rating percentages for specific companies all over the world. Additionally, the rating system may compare companies against each other in specific categories like Customer Service, Product Quality, Cleanliness, Staff Knowledgeability, etc. The rating comparisons may be viewed by businesses and users so that the rating may be both used as a business intelligence tool for business-to-business ranking of companies, and as a simple tool for a user looking to find businesses based on feedback from customer feedback of that business.

In an embodiment, the feedback system includes: a controller; and a memory coupled to the controller, wherein the memory is configured to store program instructions executable by the controller; wherein in response to executing the program instructions, the controller is configured to: register a system account for each of a plurality of users, wherein the feedback system account includes a unique identification code for each of the plurality of users; provide a graphic user interface through which each user may send feedback to other users, request feedback from other users, respond to feedback from other users, and view feedback analytics, wherein the graphic user interface provides a selected feedback tone category and a freeform text feedback input; wherein, when a first user provides feedback to a second user, a unique communication thread is generated for communications related to the feedback; wherein the feedback is tracked by its relationship with a unique identification code to generate feedback analytics including aggregated selected feedback tone category analytics.

In an embodiment, the feedback tone category is selected from the group consisting of praise and critique. Additionally, in some embodiments, the first user provides feedback to the second user anonymously, such that the identity of the first user is unknown to the second user.

In an embodiment, the plurality of users includes one or more users that is an individual and one or more of users that is a businesses. Additionally, in some embodiment, the second user is a business. Further in some embodiments, the business is a business unit. In some embodiments, the business unit is a business location. And in some embodiments, the business unit is a business department. Further, in some embodiments, the business unit is an employee.

In an embodiment, the first user is an individual for which the unique identification code is associated with demographic information. Additionally, in some embodiments, the first user is an individual for which the unique demographic information is a location.

In some embodiments, requesting feedback from other users includes the steps of: generating a request for feedback; selecting one or more groups to which to communicate the request for feedback, where in the selection of the groups includes associating one or more unique identification codes with each of the groups; receiving feedback from at least a second user associated with a unique identification code associated with one of the groups, wherein, upon receipt of the feedback from the second user, the first user is automatically authorized to reply to the second user; and accessing feedback analytics related to the feedback received in response to the request for feedback.

In an embodiment, the group is selected such that the users associated with the group of one or more unique identification codes share common demographic information. And, in some embodiments, the common demographic information is a location.

In another embodiment, a feedback system for generating direct requests includes: a controller; and a memory coupled to the controller, wherein the memory is configured to store program instructions executable by the controller; wherein in response to executing the program instructions, the controller is configured to: register a system account for each of a plurality of users, wherein the feedback system account includes a unique identification code for each of the plurality of users; provide a graphic user interface through which a first user: generates a request for feedback; selects one or more groups to which to communicate the request for feedback, where in the selection of the groups includes associating one or more unique identification codes with each of the groups; receives feedback from at least a second user associated with a unique identification code associated with one of the groups, wherein, upon receipt of the feedback from the second user, a unique communication thread is generated for communications related to the feedback; and accesses feedback analytics related to the feedback received in response to the request for feedback.

In an embodiment, the group is selected such that the users associated with the group of one or more unique identification codes share common demographic information. Additionally, in some embodiments, the common demographic information is a location. Further, in some embodiments, the feedback received from the second user in anonymous. Even further, in some embodiments, the feedback received from the second user includes a selected feedback tone category selected from the group consisting of praise and critique.

In another example, a feedback system for generating open requests includes: a controller; and a memory coupled to the controller, wherein the memory is configured to store program instructions executable by the controller; wherein in response to executing the program instructions, the controller is configured to: register a system account for each of a plurality of users, wherein the feedback system account includes a unique identification code for each of the plurality of users; provide a graphic user interface through which a first user: generates a request for feedback, wherein the request for feedback includes a unique identification code; publicly communicates the request for feedback and the unique identification code to an unspecified audience; receives feedback from at least a second user associated with a unique identification code, wherein, upon receipt of the feedback from the second user, a unique communication thread is generated for communications related to the feedback; and accesses feedback analytics related to the feedback received in response to the request for feedback.

The systems and methods described herein are primarily directed to requesting, providing, and receiving feedback, as shown by the primary examples. However, it is contemplated that the same infrastructure may be particularly well adapted to providing offers to customers and potential customers. For example, rather than sending an open request for feedback or a direct request for feedback, a user may use the communication channels established in the systems and methods described to provide an offer to a customer. By applying a unique identification code to each user and to an offer, the communication and analytics properties described herein may be applied to the offers. These offers may additionally, or alternatively, be piggybacked onto communications related to a request for feedback. For example, in response to specific praise or criticism, a business may reward a customer with a discount code or other coupon or reward. The systems and methods described herein are particularly well-adapted for providing targeted offers and rewards to specific users, as will be recognized by those skilled in the art based on the descriptions provided herein.

Additional functionality may be provided such that any time a request for feedback is made (open request or direct request), an associated microsite may be generated. A QR code, link, or other access path may be generated to enable third parties to access the microsite to provide feedback. The feedback received at the microsite is not limited to users that have assigned identification codes. Rather, the feedback received at the microsite may be provided by any person and may be funneled into a generic feedback bucket. Because the feedback is provided without an identification code, the recipient of the feedback is not able to communicate back to the person providing the feedback. This functionality enables the feedback net to expand to cover any person with access to the Internet, even if the person is not a user registered in the system. Similarly, there may be a unique microsite associated with each entity/user, regardless of whether the user has requested feedback. Such microsite may be automatically generated when a user is assigned an identification code.

An object of the invention is to provide consumers a way to send fast, direct to feedback to businesses.

Another object of the invention is to provide a channel to received consumer feedback quickly and accurately.

An advantage of the invention is that it provides a mechanism to engage consumers directly about their experiences with a company.

Another advantage of the invention is that it provides a mechanism to reach out to consumers to obtain further feedback.

A further advantage of the invention is that it provides statistical insights into received feedback.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 7 is an example view critiques screen of the feedback system for viewing feedback critical of the user.

FIG. 8 is an example create request for feedback screen of the feedback system for creating a request for feedback.

FIG. 9 is an example request response screen of the feedback system for responding to a request for feedback.

DETAILED DESCRIPTION OF THE INVENTION

Figure 1:
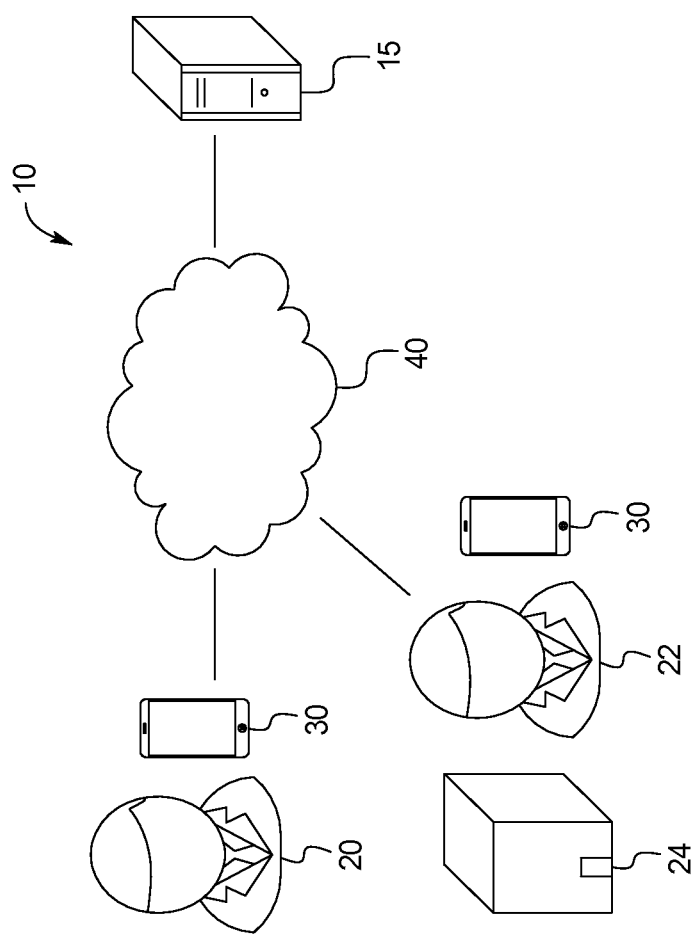
FIG. 1 illustrates the ecosystem of an example of a feedback system.
Figure 6:
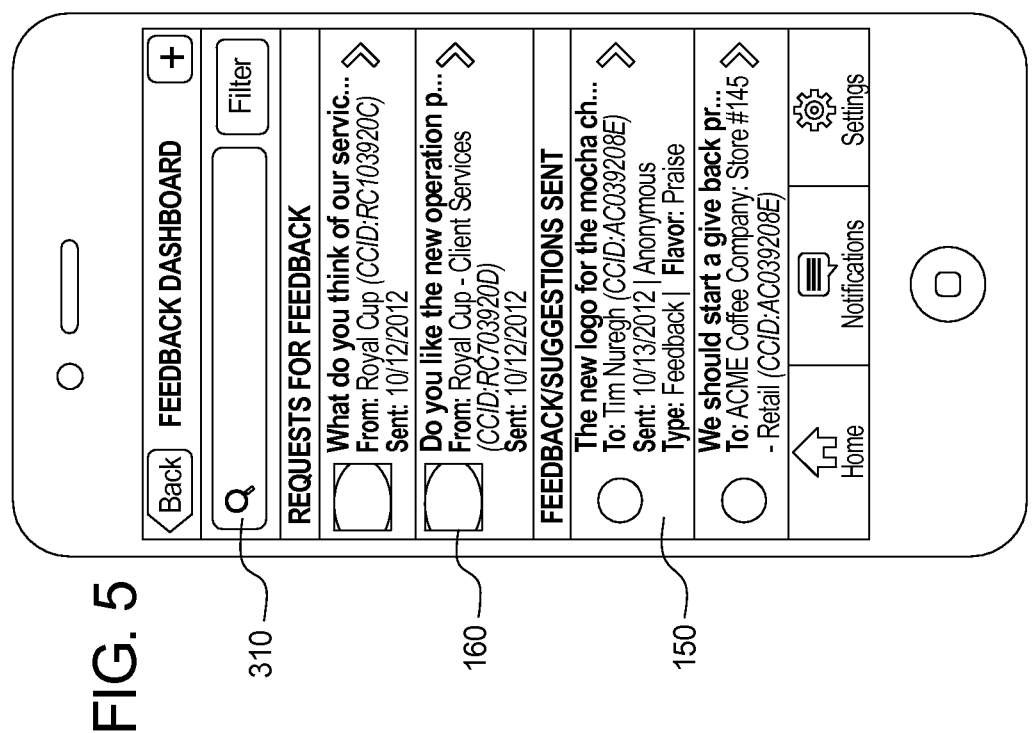
FIG. 6 is an example receive feedback dashboard of the feedback system for viewing the feedback of a user.

FIG. 1 illustrates the ecosystem of an example of a feedback system 10. As shown in FIG. 1, the feedback system 10 may include a user device 30 running a feedback application in communication with a server 15 accessible over a network 40, such as the Internet. Users 20 may include employees 22 of a business 24. It is understood that many types of organizations may choose to use the feedback system 10, for convenience, business 24 may refer to any non-individual user 20 of the feedback system 10. Every user 20 in the system and collections of users 20 may be represented by a unique identification code 95 (FIG. 6). Users 20 may link their feedback system 10 account with other social media, such as Facebook or Twitter, to permit businesses 24 to monitor user feedback 55 across multiple media channels.

Figure 2:
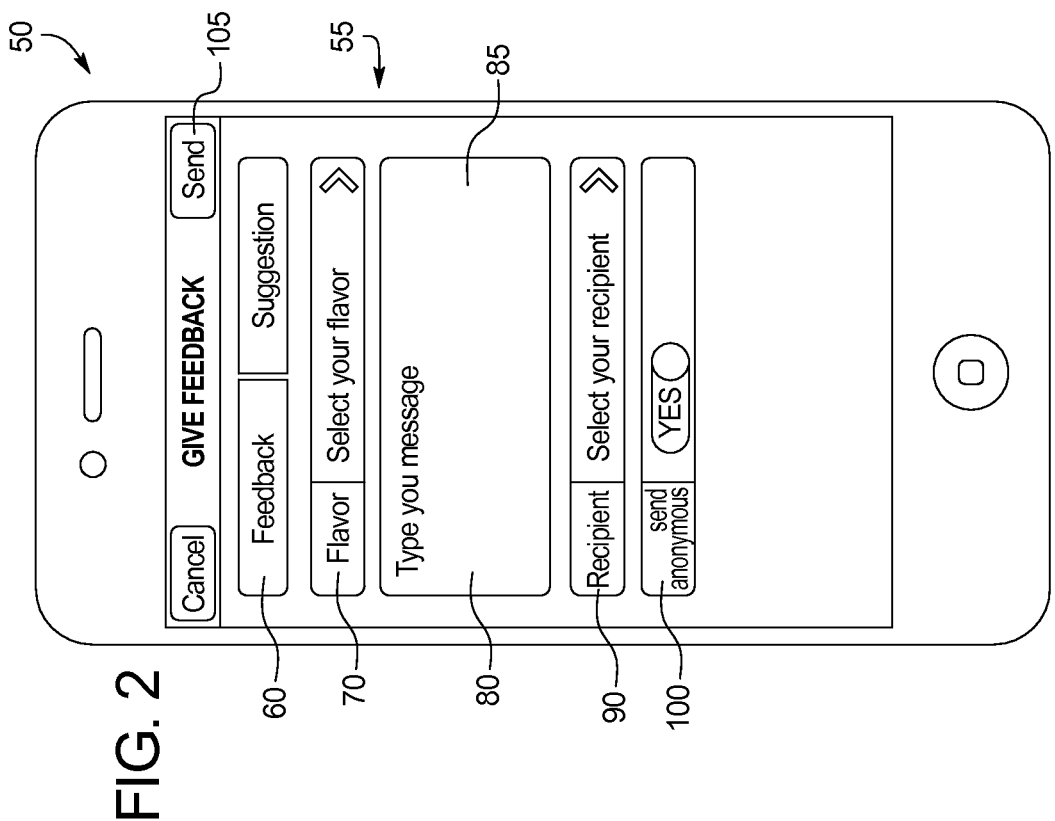
FIG. 2 is an example feedback form screen of the feedback system for inputting feedback to send to another user.

FIG. 2 is an example feedback form screen 50 of the feedback system 10 for inputting feedback 55 to send to another user 20. At any time, a user 20 may choose to provide feedback to another user 20, such as a business 24, and may access the feedback form screen 50. Through the feedback form screen 50, the user 20 may first select a feedback type 60, such as "feedback" or "suggestion." Then, the user 20 may select a feedback tone category 70 such as "praise" or "critique." Next, the user 20 may enter comments into a freeform text feedback input 80. After that, the user 20 may select a recipient 90 using recipient selection screens. The recipient 90 may be another user 20 or may be multiple users 20, such as a group 27. Further, the user 20 may elect to make the feedback anonymous by activating the anonymity button 100. Finally, when the user 20 is satisfied with the feedback 55, the user may select the send button 105 to trigger the feedback system 10 to deliver the feedback 55 to the recipient 90. In further embodiments, the user 20 may be permitted to include images, videos, files, etc. as part of the feedback 55.

Accordingly, in one specific embodiment of the feedback system 10, a user 20 may use the feedback form screen 50 to provide feedback classified as a specific feedback type (e.g., feedback, suggestion, etc.), and a specific feedback tone category (e.g., limited to a binary choice between either praise or critique), accompanying freeform feedback comments 85. Thus, even freeform feedback comments 85 may be quickly sorted and categorized for purposes of analytics, particularly aggregated analytics from one or more users 20. It is contemplated that in other embodiments, feedback may include further information. For example, feedback may include a rating to indicate satisfaction with their interaction with the business 24.

Figure 3:
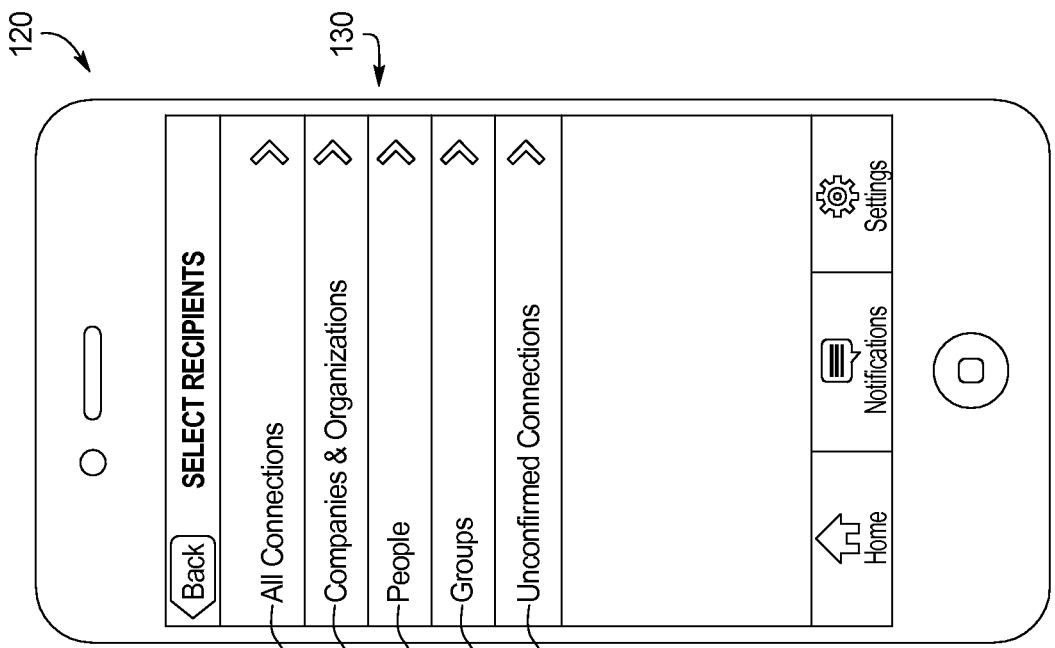
FIG. 3 is an example recipient category selection screen of the feedback system for searching recipients by category.

To find recipients 90, the users 20 may access a recipient category selection screen 120 of the feedback system 10, as shown in FIG. 3. The recipient category selection screen 120 may be used for searching recipients 90 by connection groups 130. Connection groups 130 may include, for example: all connections 131, companies and organizations 132, people 133, groups 134, and unconfirmed connections 135. After selecting a connection group 130, the user 20 may be presented with a list of recipients 90 in that connection group 130. A connection group 130 may represent the connections of a business 24, locations 25, departments 26, employees 22, and group 27. Connection groups 130 may be hierarchical, such that selecting a connection group 130 may reveal further connection groups 130. For example, if the user 20 selects companies and organizations 132, a list of connection groups 130 each representing a business 24 may be displayed. The user 20 may browse a connections group 130 for a business 24 find other users 20, such as a location 25, based on the hierarchical relationships between users 20. Users may additionally search other users 20 using a search box 310. The search box 310 may permit users to further limit recipients 90 to businesses 90 or public figures.

Figure 4:
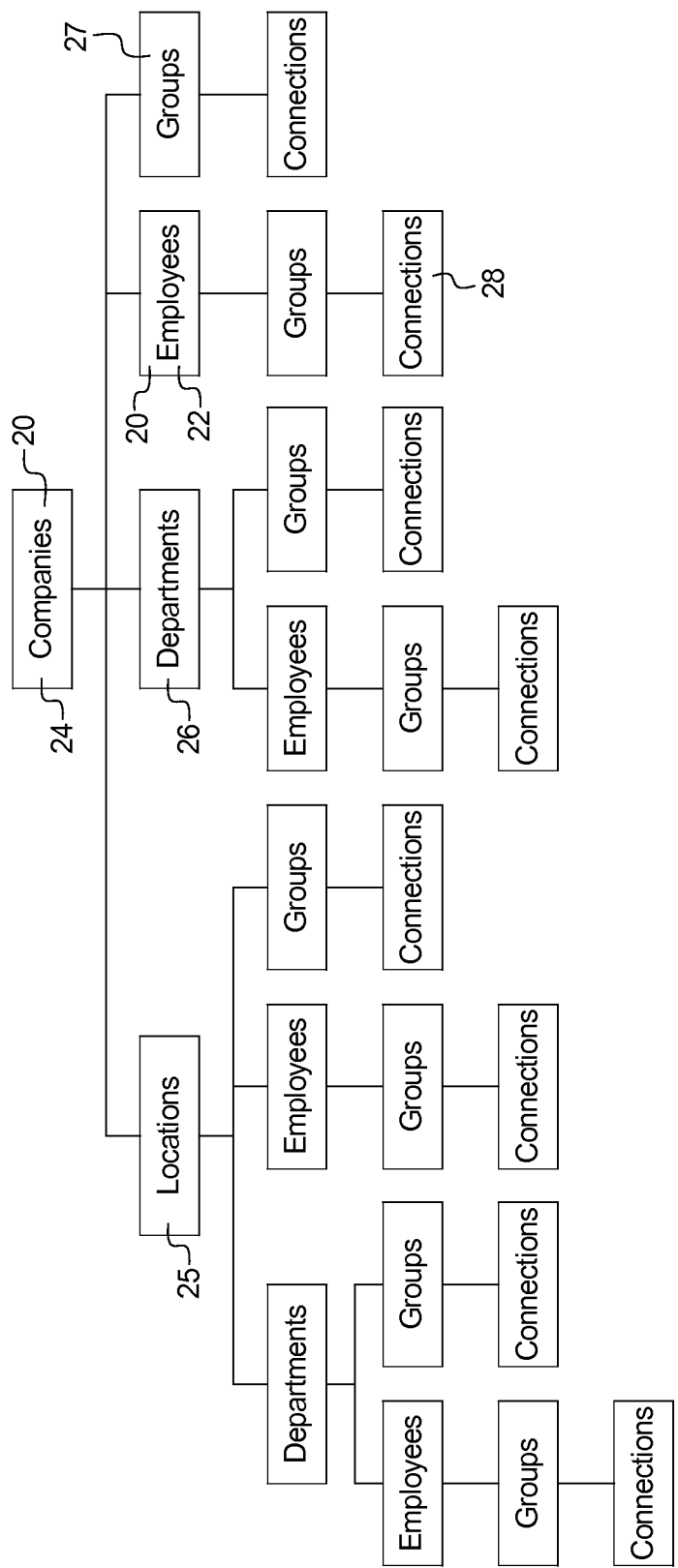
FIG. 4 is a diagram illustrating the relationship between various feedback units in the feedback system.

To better illustrate the relationship between users 20 in the feedback system 10, FIG. 4 is a diagram illustrating the relationships between various types of users 20. As shown, the feedback system 10 may permit business 40 to have user accounts for the business 40 and business subunits, such as locations 25, departments 26, employees 22, and connections 28. When browsing the feedback system 10, a user 20 may navigate the connection groups 130 representing the hierarchical relationships to find a desired user 20.

The hierarchical relationship between users 20 may be managed using the identification codes 95. Each identification code 95 may be a trackable unique identifier generated automatically for every single user 10 and entity in the feedback system 10 (such as a request for feedback 160, business 24, location 25, group 27, etc.). Users 20 may use another user's identification code 95 to establish a connection with that user 20 and/or to provide feedback 55 to that user. Additionally, the feedback system 10 may require a user 20 to use another user's identification code 95 when signing up in order to track the individual or business referring a new user 20.

Users 20 may manually sort users 20 connected to their account into groups 27. A group 27 may be given its own identification code 95. New users 20 may be given the identification code 95 of a group 27 to permit that user 20 to connect with the user 20 that created the group 27. Using this functionality, a business 24 may create a group 27 and use the identification code 95 of that group 27 in their advertisements to pre-segment new connections into different groups 27. By separating users 20 into groups 27 identifiable with the identification code 95, a user 20 may target those groups 27 with requests for feedback 160, and view statistics relating to the feedback 55 received from those groups 27.

Figure 5:
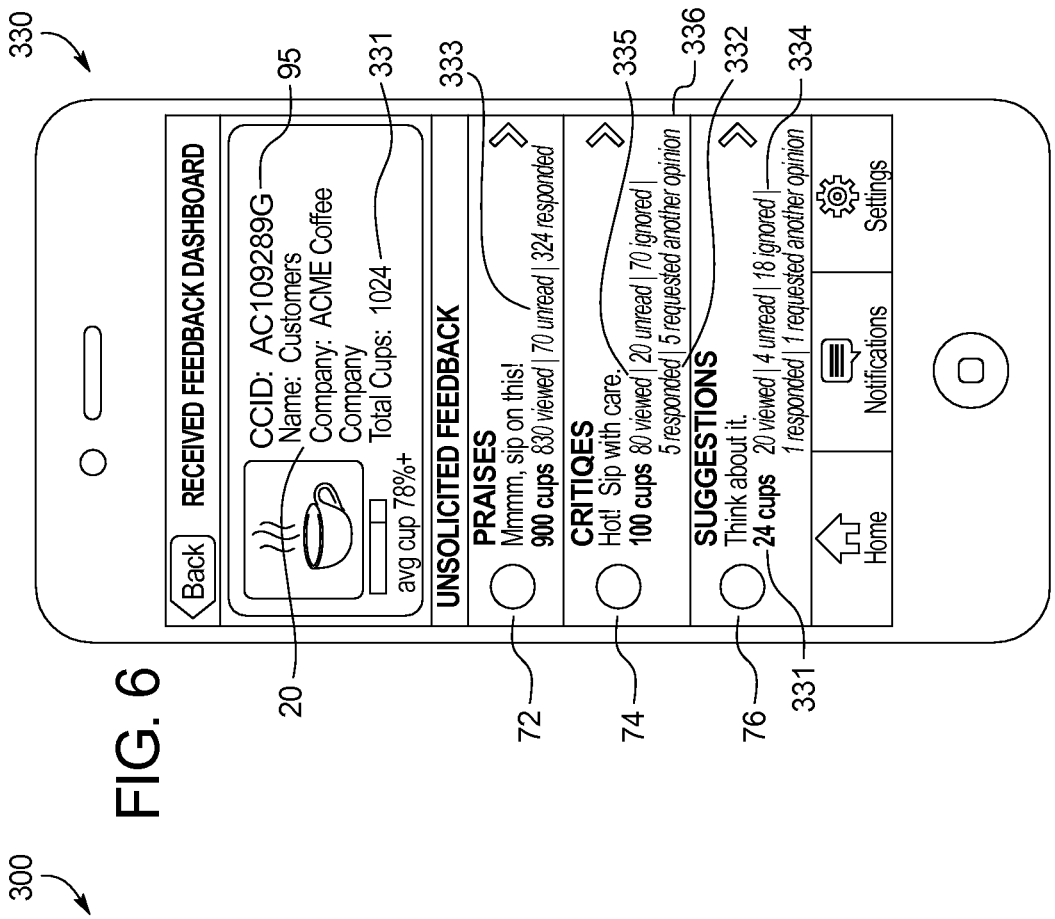
FIG. 5 is an example send feedback dashboard screen of the feedback system for viewing sent feedback and requests for feedback.

To navigate the feedback a user 20 has provided or received, the user 20 may access various dashboards. For example, FIG. 5 is an example send feedback dashboard screen 300 of the feedback system 10 for viewing sent feedback 150 and requests for feedback 160. A user 20 may access the send feedback dashboard screen 300 to view incoming requests for feedback 160 or sent feedback 150. The user 20 may select a request for feedback 160 to respond to the request on a request response screen 370. In other embodiments, a user 20 may be given an identification code 95, for example, via scanning a QR code, to access a request for feedback 160. Additionally, a user 20 may select an item of sent feedback 150 to view the feedback conversation 170. The user 20 may use a search box 310 to search requests for feedback 160 and sent feedback 150 by message wording, sender name or identification code, recipient name or identification code, type and feedback tone category, etc.

As another example of a dashboard, FIG. 6 is an example receive feedback dashboard screen 330 of the feedback system for viewing the user's own feedback 55. A user 20 may receive feedback 55 from any other user 20. Feedback 55 may include feedback categories 70 such as praises 72 and critiques 74, and may also include suggestions 76. The receive feedback dashboard 320 may show summary statistics for each feedback tone category. In the example shown in FIG. 6, the feedback dashboard screen 330 includes the user 20, identification code 95, total number 331 of feedback messages. Statistics concerning feedback 55 may be displayed for each of praises 72, critiques 74, and suggestions 76, and may include: number viewed 335, number responded 332, number unread 333, number ignored 334, and number requesting another opinion 335. The user 20 may click on praises 72, critiques 74, and suggestions 76 to bring up a screen listing feedback conversations 170. In other embodiments, in addition to statistics for praises 72, critiques 74, and suggestions 76, the example receive feedback dashboard screen 330 may include summaries and statistics for feedback categories 70 based on tags assigned to received feedback 55.

For example, FIG. 7 is an example view critiques screen 340 of the feedback system 10 for viewing feedback critical of the user 20. Similar screens may be provided for praises 72 and suggestions 76. The view critiques screen 340 may list feedback conversations 170. For each feedback conversations 170, the view critiques screen 340 may include: a preview 510 of the feedback comments 85; the status 540 of the feedback comments 85; the time 410 the feedback 55 was sent; and the last action 345 taken by the user 20 in the feedback conversations 170.

FIG. 8 is an example create request for feedback screen 350 of the feedback system 10 for creating a request for feedback 160. A user 20 may access create request for feedback screen 350 directly, or by choosing to request further feedback using the request another opinion button. The request for feedback screen 350 may include a freeform text box 351 to input the feedback request text 162. A sender input 352 may permit the user 20 to select the sender 164 of the request for feedback 160, such as their business or personal account. A feedback request type button 353 may permit the user 20 to choose between requesting direct feedback or open feedback. A direct request for feedback 160 is made by sending a request to a selected group of users 20, optionally including a specified amount of time for users 20 to answer the request. The user 20 may select a recipient 90 using a recipient selection input 354. By contrast, an open request for feedback 160 creates a QR code and/or request identification code 95 that can be used by users 20 to respond to a request for feedback 160, but is not necessarily sent directly to specific users 20. For example, an open request for feedback 160 may be made by providing a QR code in a print advertisement or in video advertising from which any viewer may provide feedback 55. The user 20 may also specify a close time 165 to limit the time users 20 have to provide the feedback and encourage promptly answering the open request for feedback 160. In an embodiment, the feedback system 10 may permit users to limit response time for direct requests to a limited time period, for example, within 6 hrs, 12 hrs, 24 hrs, 48 hrs, etc. In some embodiments, requests for feedback 160 may include discounts or incentives. These discounts and incentives may be for limited times, and may be used to encourage writing feedback 55 or further engagement with the business 24.

In response to feedback 55 received in the system 10, the system 10 creates a unique communication thread (i.e., organized grouping of communications related to the feedback 55) to which all related communications are tied. The communication thread may receive its own unique identification code 95 to help to organize the communications.

It is contemplated that in some version of the feedback system 10, the only way a business can open a communication thread with a customer is by using an open request or a direct request, but non-business users 20 can initiate communication with businesses without the limitations of an open or direct request.

As noted, requests for feedback 160 may be each given an identification code 95. Identification codes 95 may be given out as a part of a marketing campaign. For example, in such a campaign, the business 24 may distribute a number of distinct ads targeted at specific groups of identification codes 95. The business 24 may then request feedback using the identification code 95 of a request for feedback 160. For each identification code 95, the feedback 55 may aggregate the responding users 20 into groups 27 associated with the identification code 95 each user 20 referenced. Using the statistics and summary functionality, the business 24 may then learn how its various advertisements performed across various groups. For example, the business 24 could run tests of three distinct ads in each of the various U.S. regions and quickly learn which ads fare best in each region.

If the user 20 selects a request for feedback 160, the user 20 is taken to the request response screen 370 shown in FIG. 9. The request response screen 370 may display details of the request for feedback 160, such as: feedback request text 162; sender 164; identification code 95 of the sender 164; and close time 165. The feedback sender 164 may include both the business 24 sending the request for feedback 160 and the details of an individual sending employee 22, such as a name and picture, to create the feel of a genuine human connection. The user 20 may select a feedback tone category 70, such as praise or critique, and enter feedback comments 85 into a freeform feedback input 80. The user 20 may choose to send the feedback anonymously using an anonymity button 100. After entering the comments, the user 20 may click the send button 105 to send the feedback 55 to sender 164 of the request for feedback 160.

Figure 10:
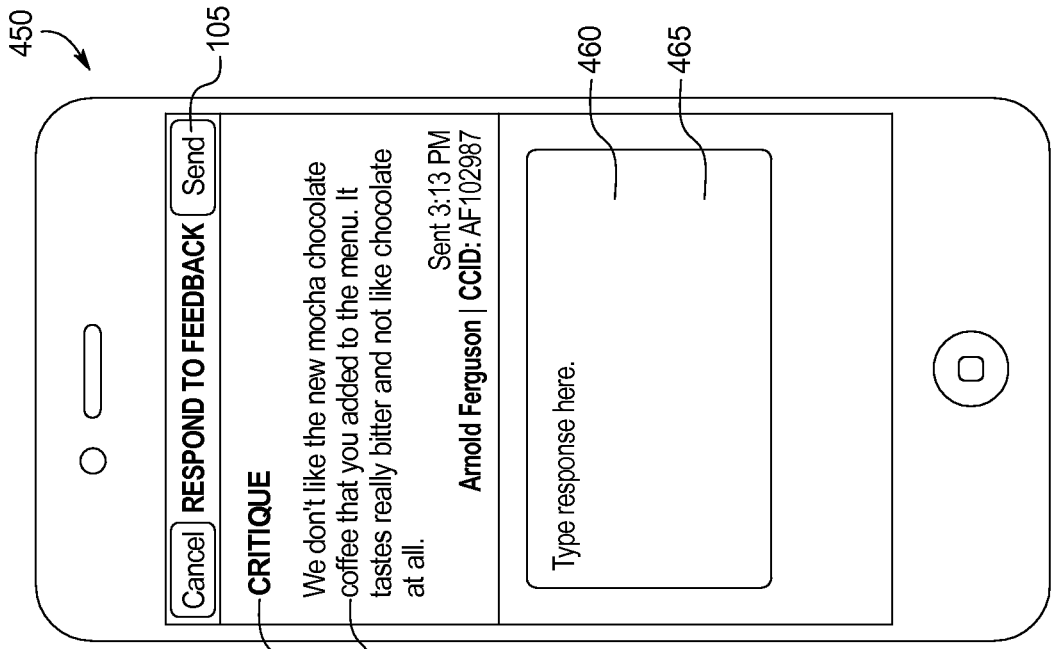
FIG. 10 is an example feedback detail screen of the feedback system for viewing the feedback in detail.

FIG. 10 is an example feedback detail screen 400 of the feedback system 10 for viewing the feedback 55 in detail. The feedback detail screen 400 may permit the user 20 to view the details of the feedback 55, including the feedback tone category 70, the feedback comments 85, the user 20 providing the feedback 55, the time 410 that the feedback 55 was posted. The feedback detail screen 400 may further provide a respond button 420 to take the user to a response to feedback screen 450, a request another opinion 430 button to permit the user to request further feedback 55 using a request for feedback 160, and an ignore button 440 to mark the feedback 55 as ignored. In other embodiments, the feedback detail screen 400 may include an input to flag feedback 55 with different levels of importance, such as "urgent," when needed. Additionally, in other embodiments, the feedback detail screen 400 may include tagging functionality to permit users 20 to tag feedback 55 for later searching. Tags may act as further feedback categories 70, and summaries and statistics may be provided for each tag.

Figure 11:
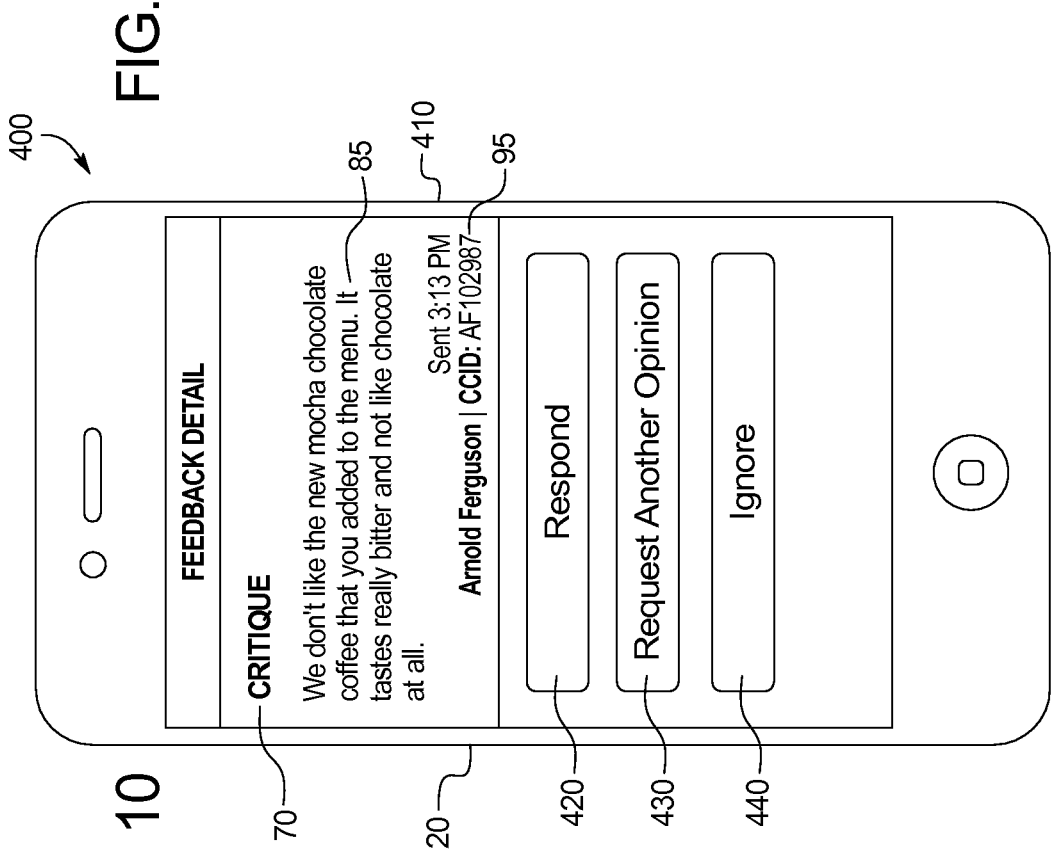
FIG. 11 is an example response to feedback screen of the feedback system for responding to feedback from another user.
Figure 12:
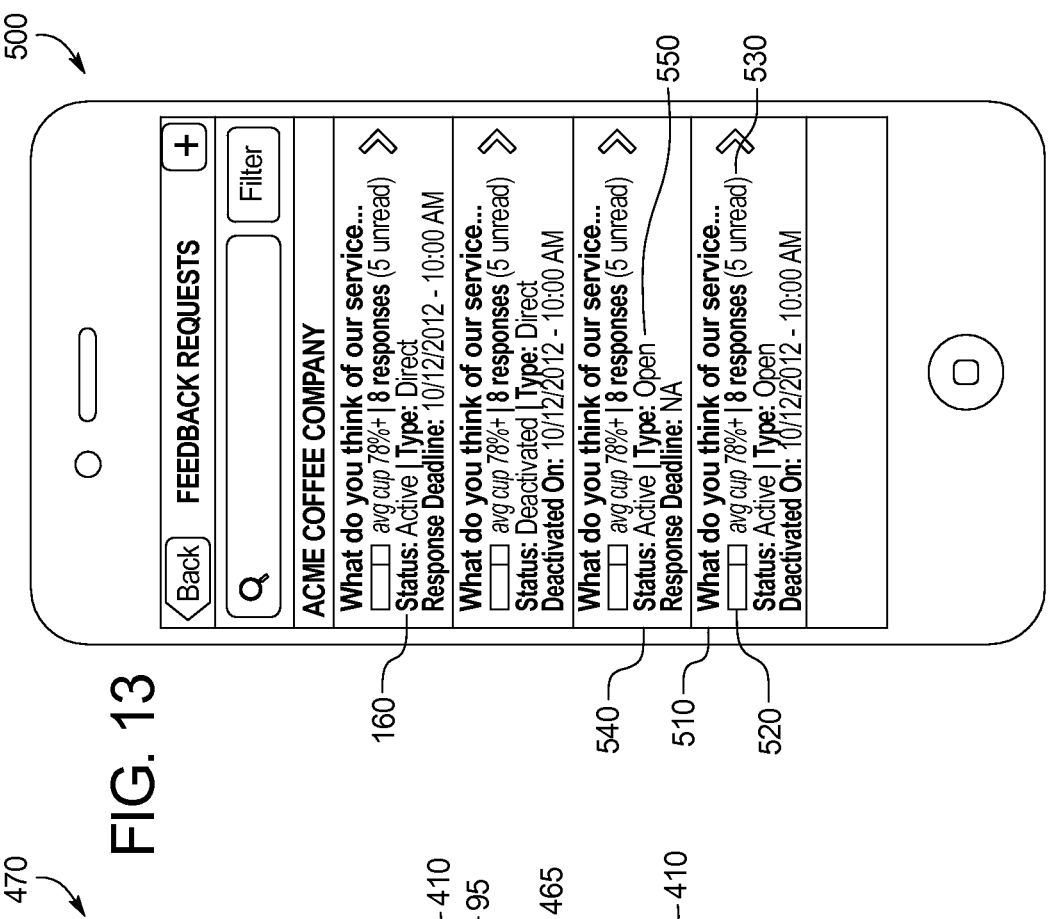
FIG. 12 is an example of a conversation view screen of the feedback system for viewing a feedback conversation with another user.

If the user 20 clicks the respond button, the user interface displays the response to feedback screen 450 shown in FIG. 11. The response to feedback screen 450 may include the details of the feedback 55, such as the feedback tone category 70, the feedback comments 85, the user 20 providing the feedback 55, and the time that the feedback 55 was posted. The response to feedback screen 450 may include a freeform text feedback response box 460 in which a user 20 may enter a feedback response 465 starting a feedback conversation. After entering a response, the user 20 may accept the feedback response 465 using the send button 105. The feedback system 10 may then forward the feedback response 465 to the user 20 that provided the feedback 55 as shown in the conversation view screen 470 of FIG. 12.

Business 24 may respond directly to a user 20 who has left them negative feedback 55 to attempt to offer a resolution to the issue, even if the user 20 wishes to remain confidential throughout that communication process. If the user 20 is satisfied with the resolution the business 24 provides, the user 20 may be permitted to make an update to their initial feedback 55 as "Resolved", which in turn may be reflected in the businesses 24 statistics and ratings on the feedback system 10.

The feedback system 10 may include functionality to view summaries and statistics of feedback 55 received. For example, company administrators and employees 22 may view analytics for any unsolicited feedback 55 received or responses to request for feedback 160 for any location 25, department 26, employees 22, or groups 27 that they have hierarchal permission to view. Additionally, individual users 20, such as employees 22, may view analytics for any unsolicited feedback 55 received or responses to feedback requests sent to the user 20. For example, the feedback system 10 may include rankings of various businesses 24 based on feedback 55 or based on customer feedback approval ratings in standardized categories, such as geographic or industry categories.

Though feedback 55 may anonymous, the feedback system 10 may track internally how many times the same user 20 gives a company positive or negative feedback 55. The feedback system 10 may also track how many times that user 20 gives feedback 55 on various businesses 24 and topics, and may calculate metrics on how many times specific users 20 and the average person gives positive, negative, or suggestion-based feedback 55 on the businesses 24 they have connected with. In some instances, this information can be used to gain better insight into whether a specific user 20 is more or less likely than typical to like or give positive, negative, or suggestion-based feedback 55 on the businesses 24 to give more complete context for a user's feedback 55. The feedback system 10 may further calculate the level of user engagement with brands. The feedback system 10 may further monitor users 20 to detect abuse of the feedback system 10, for example, attempting to saturate an account with positive feedback 55 or negative feedback 55.

Figure 13:
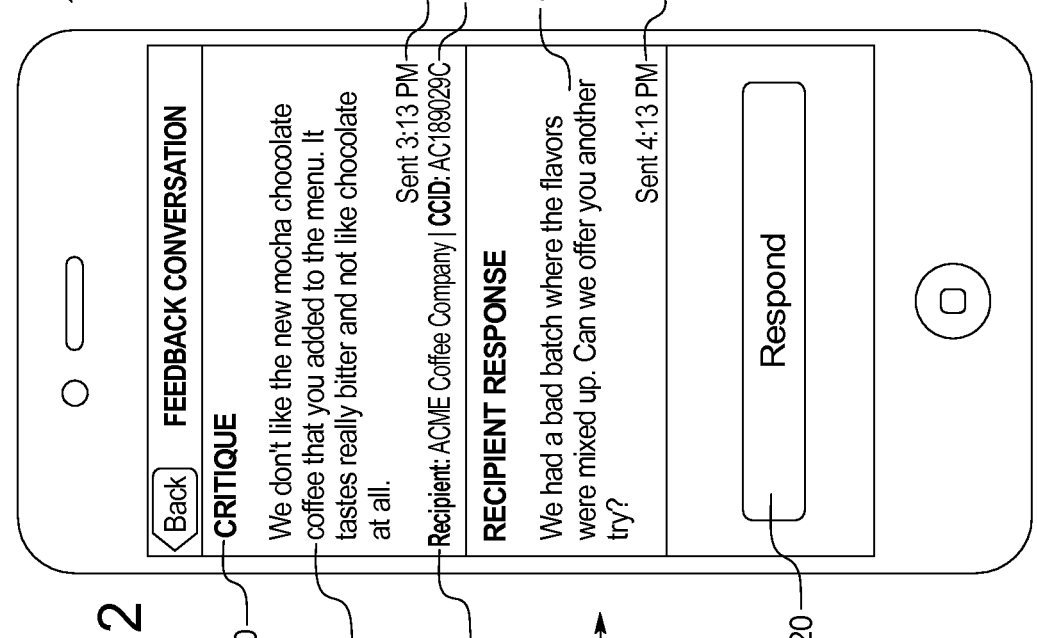
FIG. 13 is an example feedback request dashboard screen of the feedback system for viewing feedback conversations initiated using a request for feedback.

FIG. 13 is an example feedback request dashboard screen 500 of the feedback system 10 for viewing summary statistics of request for feedback 160. For each request for feedback 160, the feedback request dashboard screen 500 may include: a preview 510 of the feedback request text 162; a praise statistic 520 describes the percentage of feedback 55 that included praise; a number of responses statistic 530; the status 540 of the request for feedback 160; the feedback request type 550; and the close time 165 for the request for feedback 160. The user 20 may click on a request for feedback 160 to access feedback conversations 170 initiated using the request for feedback 160. In some embodiments, statistics, such as the praise statistic 520, the response statistic 530, may reflect recent trends rather than values reflecting all measured values.

Figure 14:
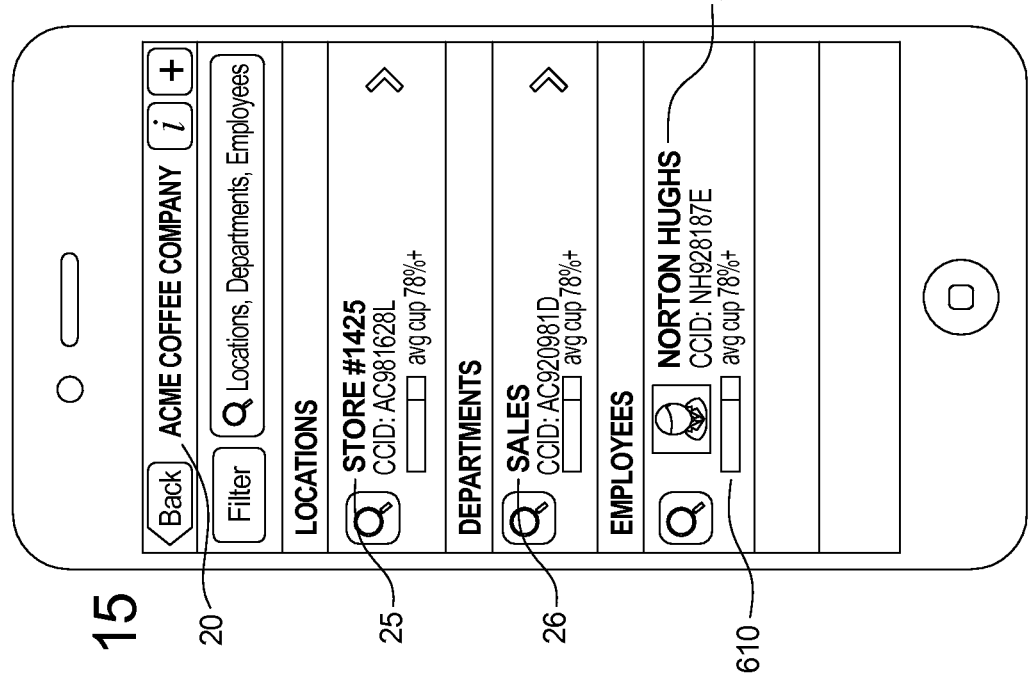
FIG. 14 is an example of a business statistics screen of the feedback system for viewing summary statistics of the feedback received by a business.

FIG. 14 is an example of a business statistics screen 550 of the feedback system 10 for viewing summary statistics of the feedback 55 received by a business 24. The business statistics screen 550 may include overview information of the business 24, such as the number of locations 551, number of departments 552, number of employees 553, number of managers 554, number of groups 555, and number of connections 556. An overview praise statistic 560 may show the percentage of feedback 55 received that was categorized as praise. A total requests statistic 570 may list the number of requests for feedback 160 sent, and list the total praise 572, and total critiques 574. A total feedback messages statistic 580 may list the number of messages of feedback 55 received, and list the total feedback praise 582, total feedback critiques 584, and the total suggestions 586. Businesses 24 and their subunits may be provided the ability to set alerts that appear in the business statistics screen 550 or other dashboards when the feedback system 10 detects that the overview praise statistic 560 or other statistics have fallen below or risen above a certain threshold setting.

Figure 15:
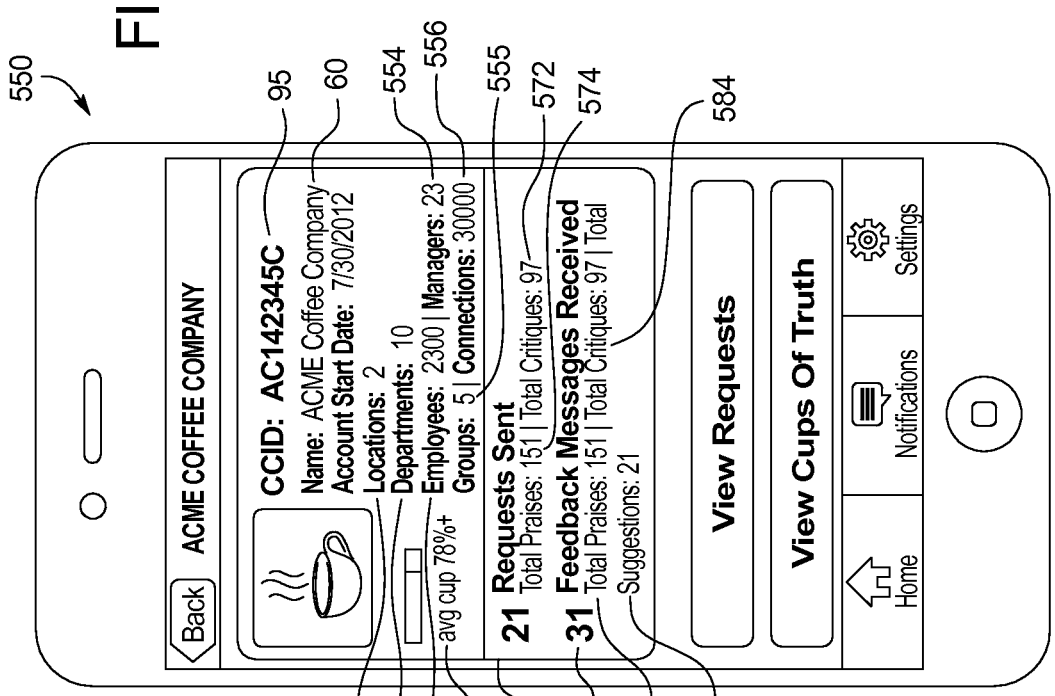
FIG. 15 is an example of a business subunit summaries screen of the feedback system for displaying summary statistics of the feedback received by the subunits of a business.

FIG. 15 is an example of a business subunit summaries screen 600 of the feedback system 10 for displaying summary statistics of the feedback 55 received by the subunits of a business. The business subunit summaries screen 600 may include a listing of various business subunits, such as locations 25, departments 26, employees 22, etc. For each subunit, the business subunit summaries screen 600 may include a subunit praise statistic 610 that may reflect the percentage of positive feedback 55 that the subunit has received.

In some embodiment, the feedback system 10 may enable feedback collaborations between businesses 24. For example, many businesses 24 sell products to distributors rather than the end customer, and thus have no way to communicate directly with the end customer. Using the feedback system 10, the distributor may permit the company to send an indirect request for feedback directly to its consumers in its connections 28. The feedback, analytics, etc. from that request may be forwarded to the business 24 without permitting the business 24 direct access to the relationships and connections 28 of the distributor.

In some embodiments, the feedback system 10 may be integrated with point-of-sale retail systems. By linking the systems, every purchase online and at every cash register of a user 20 of the feedback system 10 may be fed into a user's profile so that the company knows what the user 20 purchased. Further, users 20 may then be queried for feedback 55 regarding the user's purchase experience using requests for feedback 160. Additionally, the feedback system 10 may permit the business 24 to follow-up and ask customers would they like to purchase additional items, such as related goods and services.

In some embodiments, the feedback system 10 may permit a business 24 to compare their summaries and statistics to other users 20. For example, the feedback system 10 may include a standardized rating system. The rating system may rate or rank businesses 24 in the feedback system. The ratings may include feedback-rating percentages broken down by Country, Region, Industry, and Business Type for all companies in every market and segment across the world. Additionally, a real-time, trending, public dashboard may allows users 20 to view a feedback message board as well as feedback approval rating percentages for specific companies all over the world. Additionally, the rating system may compare companies against each other in specific categories like Customer Service, Product Quality, Cleanliness, Staff Knowledgeability, etc. The rating comparisons may be viewed by businesses 24 and users 20 so that the rating may be both used as a business intelligence tool for business-to-business ranking of companies, and as a simple tool for a user 20 looking to find businesses 24 based on feedback 55 of that business 24.

One or more controllers control aspects of the systems and methods described herein. The one or more controllers may be adapted run a variety of application programs, access and store data, including accessing and storing data in associated databases, and enable one or more interactions described herein. Typically, the one or more controllers are implemented by one or more programmable data processing devices. The hardware elements, operating systems, and programming languages of such devices are conventional in nature, and it is presumed that those skilled in the art are adequately familiar therewith.

For example, the one or more controllers may be a PC based implementation of a central control processing system utilizing a central processing unit (CPU), memories and an interconnect bus. The CPU may contain a single microprocessor, or it may contain a plurality of microprocessors for configuring the CPU as a multi-processor system. The memories include a main memory, such as a dynamic random access memory (DRAM) and cache, as well as a read only memory, such as a PROM, EPROM, FLASH-EPROM, or the like. The system may also include any form of volatile or non-volatile memory. In operation, the main memory stores at least portions of instructions for execution by the CPU and data for processing in accord with the executed instructions.

The one or more controllers may also include one or more input/output interfaces for communications with one or more processing systems. The one or more such interfaces may enable communications via a network, e.g., to enable sending and receiving instructions electronically. The communication links may be wired or wireless.

The one or more controllers may further include appropriate input/output ports for interconnection with one or more output displays (e.g., monitors, printers, touchscreen, motion-sensing input device, etc.) and one or more input mechanisms (e.g., keyboard, mouse, voice, touch, bioelectric devices, magnetic reader, RFID reader, barcode reader, touchscreen, motion-sensing input device, etc.) serving as one or more user interfaces for the controller. For example, the one or more controllers may include a graphics subsystem to drive the output display. The links of the peripherals to the system may be wired connections or use wireless communications.

Although summarized above as a PC-type implementation, those skilled in the art will recognize that the one or more controllers also encompasses systems such as host computers, servers, workstations, network terminals, and the like. Further one or more controllers may be embodied in a server or a device, such as a mobile electronic device, like a smartphone or tablet computer. In fact, the use of the term controller is intended to represent a broad category of components that are well known in the art.

Hence aspects of the systems and methods provided herein encompass hardware and software for controlling the relevant functions. Software may take the form of code or executable instructions for causing a controller or other programmable equipment to perform the relevant steps, where the code or instructions are carried by or otherwise embodied in a medium readable by the controller or other machine. Instructions or code for implementing such operations may be in the form of computer instruction in any form (e.g., source code, object code, interpreted code, etc.) stored in or carried by any tangible readable medium.

As used herein, terms such as computer or machine "readable medium" refer to any medium that participates in providing instructions to a processor for execution. Such a medium may take many forms. Non-volatile storage media include, for example, optical or magnetic disks, such as any of the storage devices in any computer(s) shown in the drawings. Volatile storage media include dynamic memory, such as main memory of such a computer platform. Common forms of computer-readable media therefore include for example: a floppy disk, a flexible disk, hard disk, magnetic tape, any other magnetic medium, a CD-ROM, DVD, any other optical medium, punch cards paper tape, any other physical medium with patterns of holes, a RAM, a PROM and EPROM, a FLASH-EPROM, any other memory chip or cartridge, or any other medium from which a computer can read programming code and/or data. Many of these forms of computer readable media may be involved in carrying one or more sequences of one or more instructions to a processor for execution.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A feedback system comprising:
   a controller; and
   a memory coupled to the controller, wherein the memory is configured to store program instructions executable by the controller;
   wherein in response to executing the program instructions, the controller is configured to:
   register a system account for each of a plurality of users, wherein the feedback system account includes a unique identification code for each of the plurality of users;
   provide a graphic user interface through which each user may send feedback to other users, request feedback from one or more other users, respond to feedback from other users, and view feedback analytics, wherein the graphic user interface includes a feedback form screen through which each user providing feedback enters freeform text via a freeform text feedback input and a selected feedback tone category via a feedback tone category input, wherein the selected feedback tone category is the feedback tone identified by the user providing feedback as representative of the tone of the free form text;
   wherein, when a first user provides feedback to a second user, the controller generates a unique communication thread for communications related to the feedback, wherein the feedback is tagged by the controller according to the selected feedback tone category;
   wherein the controller tracks the feedback by its relationship with one of the plurality of unique identification codes and generates feedback analytics including aggregated feedback tone category analytics; and
   wherein for each feedback requested from a plurality of other users, the controller tracks the total number of feedback received, the number of feedback received having a first selected feedback tone, the number of feedback received having a second selected feedback tone, the number of feedback requests for which responses are not received, wherein the feedback analytics for each feedback requested from other users includes an overall approval rating based on the percentage of feedback sent having the first selected feedback tone, a number of feedback received having the first selected feedback tone, a number of feedback received having the second selected feedback tone, a number of responses based on the total number of feedback received, and a number of feedback requests ignored based on the number of feedback requests for which responses are not received.

2. The system of claim 1 where the first user provides feedback to the second user anonymously, such that the identity of the first user is unknown to the second user.

3. The system of claim 1 wherein, requesting feedback from other users includes the steps of:
   generating a new request for feedback;
   selecting one or more groups to which to communicate the request for feedback, where in the selection of the groups includes associating one or more of the unique identification codes with each of the groups;
   receiving feedback from at least a responding user whose associated unique identification code is associated with one of the groups, wherein, upon receipt of the feedback from the responding user, a unique communication thread is generated for communications related to the feedback; and
   accessing feedback analytics related to the feedback received in response to the request for feedback.

4. The system of claim 3 wherein the group is selected such that the users associated with the group of one or more unique identification codes share common demographic information.

5. The system of claim 4, wherein the common demographic information is a location.

6. The system of claim 1 wherein the plurality of users includes one or more users that is an individual and one or more of users that is a business.

7. The system of claim 6 wherein the second user is a business.

8. The system of claim 7 wherein the first user is an individual for which the unique identification code is associated with demographic information.

9. The system of claim 8 wherein the first user is an individual for which the unique demographic information is a location.

10. The system of claim 7 wherein the business is a business unit.

11. The system of claim 10 wherein the business unit is a business location.

12. The system of claim 10 wherein the business unit is a business department.

13. The system of claim 10 wherein the business unit is an employee.

14. A feedback system comprising:
    a controller; and
    a memory coupled to the controller, wherein the memory is configured to store program instructions executable by the controller;
    wherein in response to executing the program instructions, the controller is configured to:
    register a system account for each of a plurality of users, wherein the feedback system account includes a unique identification code for each of the plurality of users;
    provide a graphic user interface through which a first user:
    generates a request for feedback;
    selects one or more groups to which to communicate the request for feedback, where in the selection of the groups includes associating one or more unique identification codes with each of the groups;
    receives feedback from at least a second user associated with a unique identification code associated with one of the groups, wherein, upon receipt of the feedback from the second user, a unique communication thread is generated for communications related to the feedback, and wherein the feedback is associated with the unique identification code of the second user providing the feedback and wherein the graphic user interface includes a feedback form screen through which the second user enters freeform text via a freeform text feedback input and a selected feedback tone category via a feedback tone category input, wherein the selected feedback tone category is the feedback tone identified by the second user as representative of the tone of the free form text; and accesses feedback analytics related to the feedback received in response to the request for feedback;

wherein the feedback analytics include an overall approval rating based on a percentage of feedback received having a first selected feedback tone, a number of feedback received having the first selected feedback tone, a number of feedback received having a second selected feedback tone, a number of responses based on a total number of feedback received, and a number of feedback requests ignored based on the number of unique identification codes from which feedback was requested and not received.

15. The system of claim 14 wherein the group is selected such that the users associated with the group of one or more unique identification codes share common demographic information.

16. The system of claim 15, wherein the common demographic information is a location.

17. The system of claim 15 wherein the feedback received from the second user in anonymous.

* * * * *